(12) United States Patent
Voss et al.

(10) Patent No.: US 9,479,712 B2
(45) Date of Patent: Oct. 25, 2016

(54) IMAGE BLENDING BASED ON IMAGE REFERENCE INFORMATION

(75) Inventors: Shane D. Voss, Fort Collins, CO (US); Robert P. Cazier, Fort Collins, CO (US); Jason Yost, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1259 days.

(21) Appl. No.: 12/892,107

(22) Filed: Sep. 28, 2010

(65) Prior Publication Data

US 2012/0075482 A1 Mar. 29, 2012

(51) Int. Cl.
*H04N 5/225* (2006.01)
*H04N 5/272* (2006.01)
*G06T 5/50* (2006.01)

(52) U.S. Cl.
CPC .............. *H04N 5/272* (2013.01); *G06T 5/50* (2013.01); *G06T 2207/20221* (2013.01)

(58) Field of Classification Search
CPC ........................................ H04N 5/272
USPC ................ 348/207.1, 211.02, 211.11
See application file for complete search history.

(56) References Cited

U.S. PATENT DOCUMENTS

| | | |
|---|---|---|
| 7,098,914 B1 * | 8/2006 | Katayama et al. ........... 345/427 |
| 2003/0193603 A1 * | 10/2003 | Parulski et al. ......... 348/333.12 |
| 2009/0202176 A1 | 8/2009 | Hwang |
| 2009/0219392 A1 * | 9/2009 | Roskowski ................. 348/143 |
| 2009/0324058 A1 * | 12/2009 | Sandage et al. ............. 382/154 |
| 2010/0111441 A1 * | 5/2010 | Xiong et al. ................ 382/275 |

* cited by examiner

*Primary Examiner* — Usman Khan
(74) *Attorney, Agent, or Firm* — HP Inc. Patent Department

(57) ABSTRACT

A target image is obtained from a cloud database based on reference information associated with a source image that is captured by an image capture device. The target image is blended with the source image to generate a blended image.

14 Claims, 3 Drawing Sheets

IMAGE BLENDING BASED ON IMAGE REFERENCE INFORMATION

BACKGROUND

Photographs and other images captured by digital cameras can have high levels of image noise. As used herein, image noise refers to variations (usually unwanted) in brightness, color and/or other aspects of image quality in images produced by a digital camera or other image capture device. High levels of image noise can affect an image to the point where a user decides not to save, share or print the image.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

Various embodiments described herein facilitate image registration and blending using high quality images maintained in a cloud database or other network database.

Image registration is the process of transforming different sets of data (e.g., image data) into a common coordinate system. Data used for image registration may be derived from multiple different digital photographs, different sensors, etc. By bringing image data together into a common coordinate system, image registration facilitates image blending.

For example, an image capture device, such as a digital camera, may be used to capture multiple images of a scene. If the quality of the capture device and/or the image is low, image registration can be performed on the multiple images. After image registration, several or all of the multiple images can be blended to reduce image noise in the final blended image. However, if all of the images used for blending were captured by the same low-quality capture device, the improvement in the final blended image may be minimal.

Accordingly, embodiments described herein use database of images captured by various devices (e.g., digital cameras, camera phones, smartphones, video cameras, etc.) to improve the overall quality of an image captured by a particular image capture device. In particular, the image capture device tags or associates images with reference information (e.g., location, device orientation, magnetic direction, etc.) that can be used to find one or more matching images in the database. Image registration is performed on at least one matching image from the database and the database image is subsequently blended with the original image to improve one or more image qualities of the original image.

Figure 1:
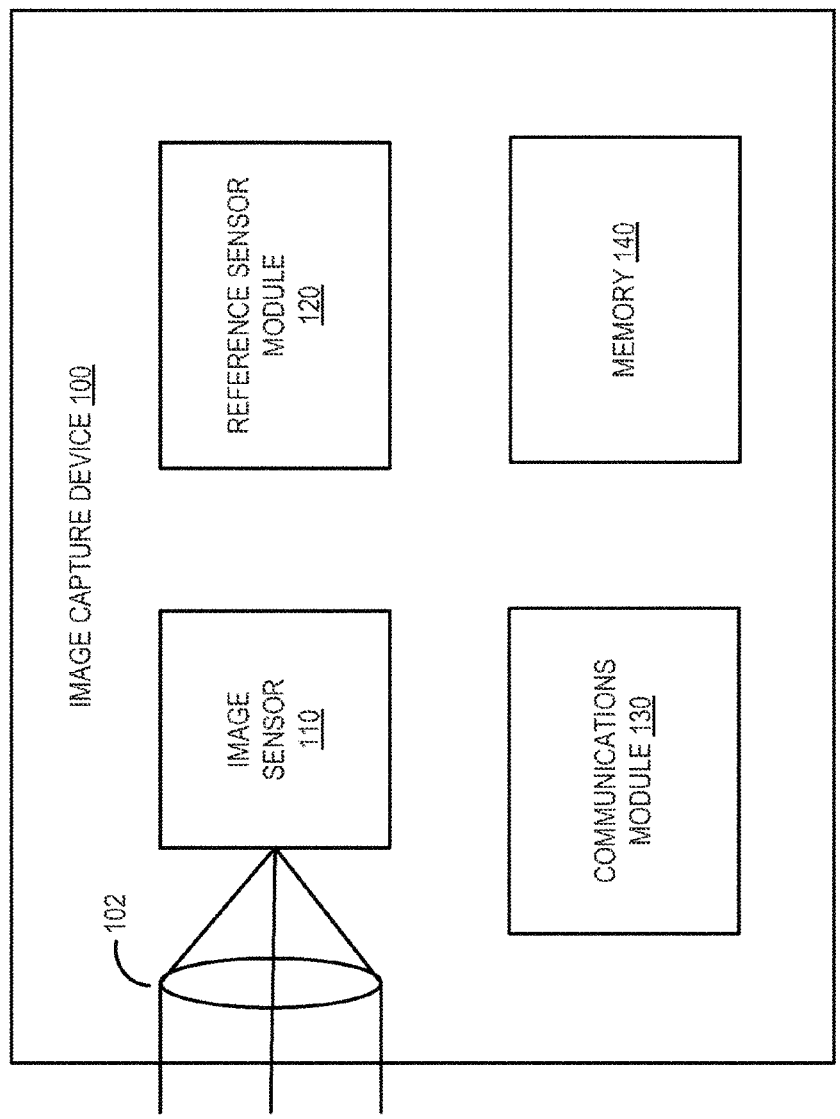
FIG. 1 is a block diagram illustrating a system according to various embodiments.

FIG. 1 is a block diagram illustrating a system according to various embodiments. FIG. 1 includes particular components, modules, etc. according to various embodiments. However, in different embodiments, other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

In FIG. 1, image capture device 100 may be a digital camera, a cell phone camera, smartphone camera, a video camera or any other device capable of converting optical images to digital images. Optical system 102 produces optical images that are captured and converted to digital images by image sensor 110. Reference sensor module 120 acquires external sensory data in connection with image capture by image sensor 110. Reference sensor module 120 may be an orientation sensor (e.g., accelerometer, gyroscope, etc.), a magnetometer, a location sensor (e.g., GPS), or other sensor capable of providing information that describes the position, location and/or orientation of image capture device 100 with respect to one or more reference axes. In certain embodiments, reference sensor module 120 may be a combination of various reference sensors such as, but not limited to, those described above. For example, in some embodiments, reference sensor module 120 may collect sufficient information to describe the orientation of image capture device 100 on a six axis basis (e.g., horizontal position, vertical position, rotation on the z-axis, yaw, pitch and roll). To accomplish this, reference sensor 120 may additionally include GPS location information, time and date of image capture, as well as various exposure-related details (e.g., white-balance levels, focus position, etc.) for a captured image.

Communications module 130 sends an image captured by device 100 (referred to herein as either a source image or a reference image) along with associated external sensory information (e.g., the reference information described above) to a processing entity via a network connection. Communications module 130 can be any type of module capable of communication with an external network. For example, communications module 130 could be a LAN (local area network) module, such as an Ethernet module. In various embodiments, communications module is a wireless communications module. Examples of wireless communications modules include WLAN (wireless local area network) modules, cellular radio modules (e.g., 2G, 3G, WiMax, Ultra Mobile Broadband, 3GPP Long Term Evolution, 4G, etc.) and the like.

In response to sending a source image with associated external sensory data to a processing entity, communications module 130 subsequently receives a blended version of the image from the processing entity and stores it in memory 140. The blended version of the image is generated by blending the original source image with a similar image selected from a database based on the external sensory data. For example, a user of image capture device 100 may capture an image of the Eiffel Tower in Paris, France. In conjunction with the image capture, the Eiffel Tower image is tagged with reference information (e.g., GPS location, time of capture, magnetic direction of capture, orientation, etc.) by reference sensor module 120. Based on the reference information, a similar image of the Eiffel Tower is selected from the database (e.g., captured from a similar location, at a similar time, with a similar camera orientation, etc.). The database image of the Eiffel Tower may then be transformed (e.g., via image registration) such that at least one element of the database image aligns with a common element of the original image. For example, image registration may result in the tower from the database image aligning with the tower in the original image. Once one or more image elements are aligned, the database image and the original image are blended to generate a blended version of the original that has improved image quality characteristics (e.g., white-balance, color, focus, etc.) and/or reduced image noise.

Figure 2:
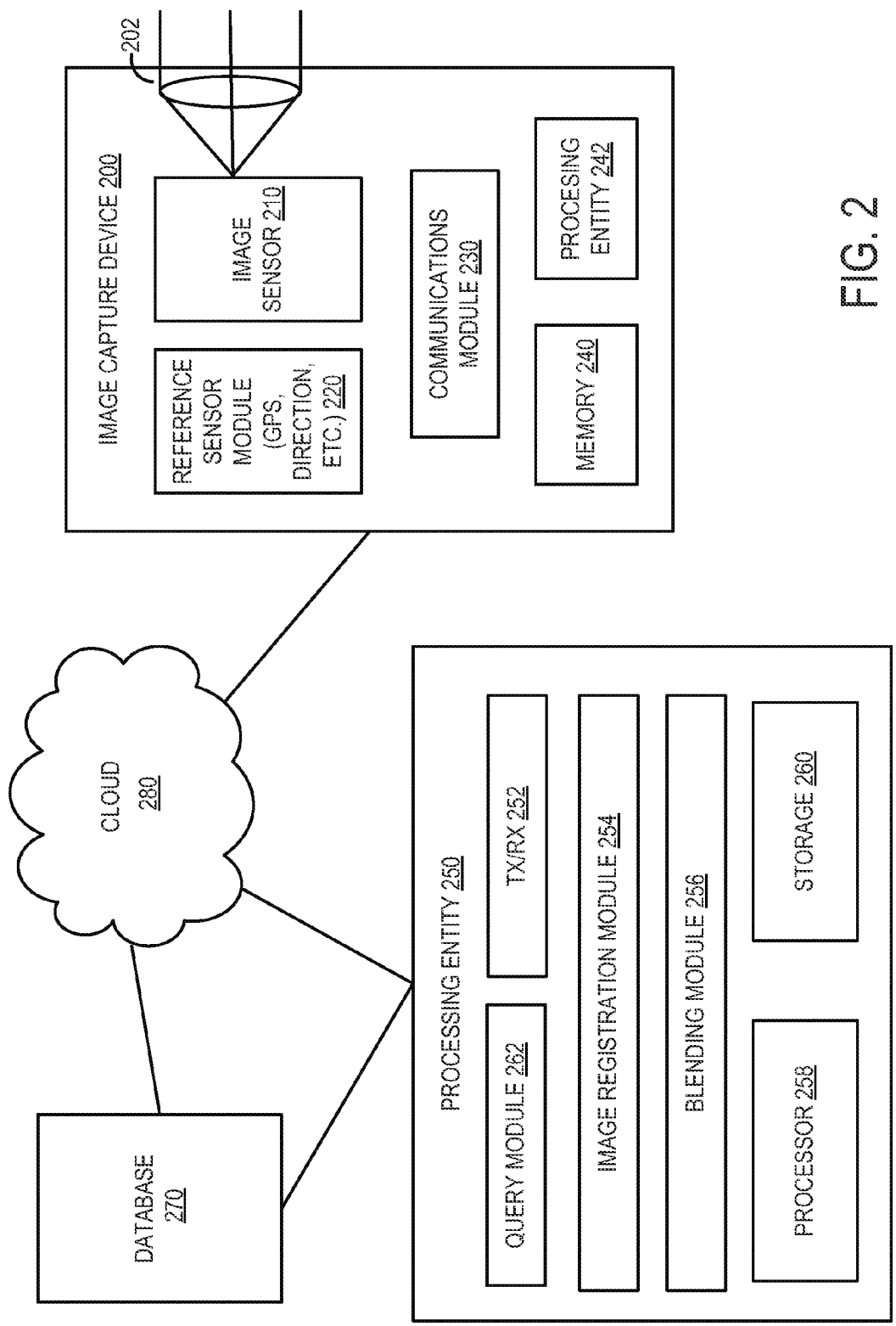
FIG. 2 is a block diagram illustrating a system according to various embodiments.

FIG. 2 is a block diagram of a system according to various embodiments. FIG. 2 includes particular components, modules, etc. according to various embodiments. However, in different embodiments, other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

In FIG. 2, image capture device 200 may be a digital camera, a cell phone camera, smartphone camera, a video camera, or any other device capable of converting optical images to digital images. Optical system 202 produces optical images that are captured and converted to digital images by image sensor 210. Reference sensor module 220 acquires external sensory data in connection with image capture by image sensor 210. Reference sensor module 220 may be a single sensor (e.g., an orientation sensor, a magnetometer, a location sensor, etc.), or it may be comprised of multiple sensors capable of providing information that describes the position, location and/or orientation of image capture device 200. For example, in some embodiments, reference sensor module 220 may collect information to describe the orientation of image capture device 200 on a six axis basis (e.g., horizontal position, vertical position, rotation on the z-axis, yaw, pitch and roll). In other embodiments, reference sensor module 220 collects information to describe orientation using fewer than six axes.

In addition to the orientation information described above, in various embodiments, reference sensor module 220 includes GPS location information, time and date of image capture, and/or various exposure-related details (e.g., white-balance levels, focus position, etc.) for a captured image.

Communications module 230 can be any module capable of communicating generally with cloud 280, or more specifically, with processing entity 250, and/or database 270 (either directly or indirectly). Cloud 280 is representative of various forms of Internet-based computing. In certain embodiments, cloud 280 could be representative of a private network connection to processing entity 250 and/or database 270.

In an example, communications module 230 sends an image captured by device 200 (referred to herein as either a reference image or a source image) along with reference information for the source image acquired by reference sensor module 230 to cloud 280 where it is subsequently received by receiver 252 on processing entity 250. Processing entity 250 can be a server, a plurality of servers, or any other cloud-connected device capable of processing image information.

Query module 262 queries database 270 using the received reference information for the source image to find a matching image. In various embodiments, database 270 contains high quality images that, when blended with a source image, are likely to reduce the image noise in the source image. Of course, it is not necessary that embodiments described herein maintain a quality threshold for images stored in database 270.

In an example, processing entity 250 receives a source image from image capture device 200 taken of the Eiffel tower in Paris, France. The reference information included with the source image contains the GPS location, time and date associated with the image capture. In addition, the reference information includes the magnetic direction and orientation of image capture device 200 at the time the source image was captured. Query module 262 sends a query to database 270 based on the received reference information. While the exact criteria for selecting a matching target image may vary according to circumstances, database 270 returns a target image that matches (e.g., within a threshold) the reference information in the query. In other words, the retrieved target image is also an image of the Eiffel tower, taken from the same location (e.g., within a threshold) and facing the same direction (e.g., within a threshold).

Based on the time and date information of the source image, the target image may have similar lighting characteristics. For example, if the original source image was taken at sunset in July, database 270 might return a target image taken at nearly the same time during the same month (though perhaps not in the same year). Database 270 may also use a table or computer-coded process to determine the time of sunset in different months to find other target images taken at sunset to increase the likelihood of finding a target image whose reference information matches that of the source image.

Though the example described above uses GPS location, magnetic direction, time and date to find a suitable target image, it should be understand that more, less, or different reference information, such as described herein, can be used in matching the source image with a target image. In various embodiments, the accuracy of matching results may increase as the quantity and/or quality of reference information increases.

Image registration module 254 performs image registration on the target image returned from database 270. In particular, the target image is transformed to align with the source image. For example, a query of database 270 may return a target image captured from a slightly different location than the source image. However, by transforming the image (e.g., shifting, scaling, etc.) to align with the source image (e.g., aligning the tower in a target image of the Eiffel tower and in a source image of the Eiffel tower), the two images can be combined and/or blended to generate an enhanced final image. Image registration may be intensity-based or feature-based. Intensity-based methods compare intensity patterns in images via correlation metrics, while feature-based methods find correspondence between image features such as points, lines, and contours.

Blending module 256 uses the transformed target image from image registration module 254 to blend with the original source image captured by image capture device 200. Various types of blending and/or blending modes may be used by blending module 256. For example, blending module 256 may perform dodging, burning, division, addition, subtraction, darkening, lightening, luminosity adjustments, and/or hue, saturation, color adjustments, etc. In some embodiments, more than one target image might be retrieved from database 270 and used for blending with the original source image.

The blending results from blending module 256 are sent via transmitter 252 back to image capture device 200 where they are received by communications module 230. In various embodiments, the user of image capture device 200 is shown a preview of the blended image on a display (e.g., LCD display) of the device and is given the opportunity to save the blended image in memory 240. Accordingly, in embodiments where image capture device 200 is a low quality capture device, a user is able to enhance the quality of various images captured by device 200 using the features described herein.

Various modules and/or components illustrated and described in FIG. 2 may be implemented as a computer-readable storage medium containing instructions executed by a processor (e.g., processor 258) and stored in a memory (e.g., storage 260). Additionally, the various modules of processing entity 250 could be implemented directly on image capture device 200 as processing entity 242.

Figure 3:
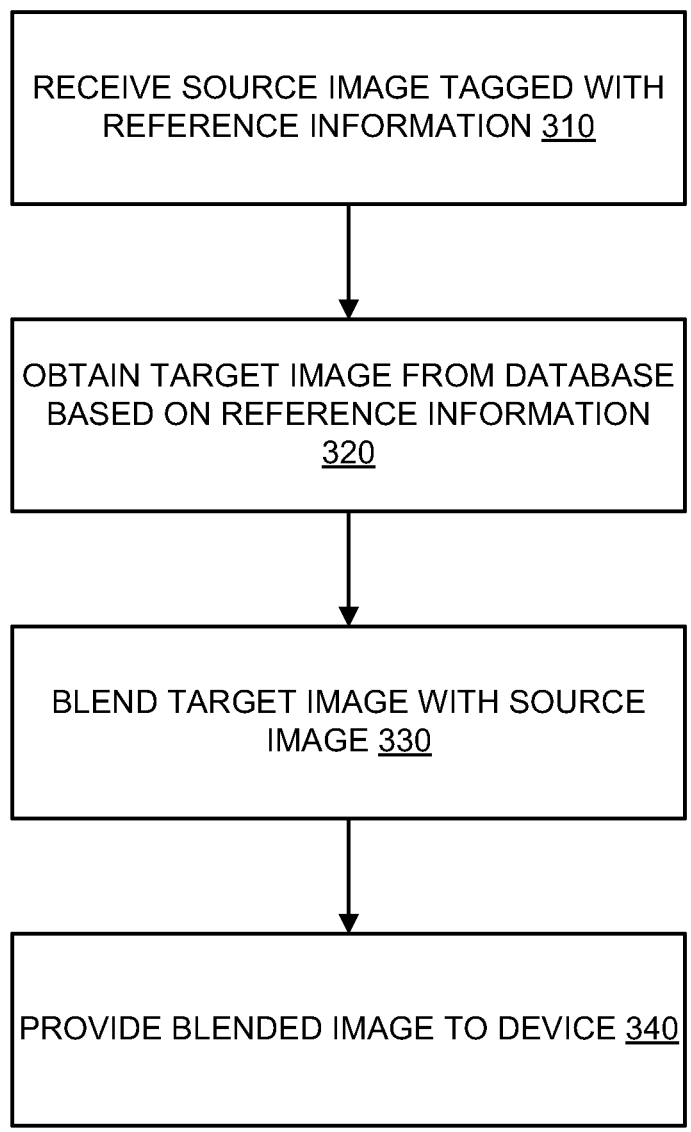
FIG. 3 is a flow diagram of operation in a system according to various embodiments.

FIG. 3 is a flow diagram of operation in a system according to various embodiments. FIG. 3 includes particular operations and execution order according to certain embodiments. However, in different embodiments, other operations, omitting one or more of the depicted operations, and/or proceeding in other orders of execution may also be used according to teachings described herein.

A processing entity receives 310 a source image captured by a device (e.g., a digital camera, cell phone camera, smartphone camera, video camera, etc.). The source image may be a still image or it may be a frame or group of frames belonging to a video segment. The source image is received via a network connection (e.g., Ethernet, LAN, WLAN, etc.). The reference information may include location, orientation, direction, time/date of capture, and/or other information used to describe the position and/or conditions of the camera when the source image was captured.

Based on the reference information, a target image is obtained 320 from a database. For example, the target image may be selected because it was similarly captured from the same location, with the camera pointed in the same direction, and with the camera having the same orientation (e.g., on one or multiple axes). In certain embodiments, some types of reference information may be given more weight in selecting a target image. For example, location information might be given more weight than date information.

The selected target image is blended 330 with the source image to generate a blended image. In various embodiments, the blending comprises image registration followed by image blending. In other words, at least one element of the target image is transformed to align with a common element in the source image. For example, the target image may be transformed such that a particular line in the target image is brought into alignment with a similar line in the source image (e.g., the outline of the tower in an image of the Eiffel tower). By transforming the target image to align with the source image, the two images may be blended according to various blending techniques and/or modes, such as those described herein.

In certain embodiments, the processing entity responsible for blending may determine a subject in the source image that is not contained in the target image. Using the Eiffel tower example described previously, the source image may include the photographer's friend standing prominently in front of the Eiffel tower. If the friend is not included in the target image, the processing entity may preclude the image elements representing the friend in the source image from being blended with the target image. In this way, the friend in the source may be retained in the final blended image. Of course, in other embodiments, a subject found in the source image that is not contained in the target image could be included in the blending (e.g., to reduce image noise) while still being preserved as a subject in the final blended image.

In a situation where the target image contains a subject that is not included in the original source image, the elements of the subject in the target image may be deleted from the final blended image. For example, if the target image contains a person in the foreground of an Eiffel tower image, that person could be deleted from the final blended image given that the person wasn't part of the photographic scene in the source image.

The final blended image is provided 340 via network connection to the device that captured the original source image. In some embodiments, the final blended image could be sent to a device or entity other than the original capturing device.

Various modifications may be made to the disclosed embodiments and implementations of the invention without departing from their scope. Therefore, the illustrations and examples herein should be construed in an illustrative, and not a restrictive sense.

The invention claimed is:

1. A method, comprising:
   receiving from an image capture device a source image and reference information associated with capturing the source image, the reference information including external sensory information including a horizontal position of the image capture device, a vertical position of the image capture device, and a magnetic direction of the image capture device;
   creating, by a processor, a query including the reference information, the query requesting a target image matching the reference information;
   transmitting the query to a remote network database via a network interface
   receiving the target image matching the reference information; and
   blending, by the processor, the target image with the source image to generate a blended image.

2. The method of claim 1, wherein the query requesting a target image matching the reference information includes further external sensory information selected from the group consisting of: rotation on the z-axis of the device, device yaw, device pitch, and device roll.

3. The method of claim 1, wherein the source image is received via the network interface.

4. The method of claim 1, wherein blending the target image with the source image comprises:
   transforming, by the processor, at least one element of the target image to align with a common element of the source image to produce a transformed version of the target image; and
   blending, by the processor, the transformed version of the target image with the source image to generate the blended image.

5. An image processing apparatus, comprising:
   a processor and a memory device, the memory device comprising instructions that when executed cause the processor:

receive from a wireless device a reference image and external sensory data associated with the reference image, the external sensory data including a horizontal position of the wireless device, a vertical position of the wireless device, and a magnetic direction of the wireless device; and generate and transmit to a remote network database a query requesting a similar image matching the external sensory data;

receive the similar image matching the external sensory data and transform the similar image in order to align an element of the similar image with a common element in the reference image;

blend the reference image from the wireless device and the transformed similar image from the network database to generate a final image; and transmit the final image to the wireless device.

6. The apparatus of claim 5, wherein the received external sensory data includes at least one of:

location information of the reference image;
time and date of reference image capture; and
exposure-related details of the reference image.

7. The apparatus of claim 5, wherein the apparatus includes a wireless communication module.

8. A non-transitory computer-readable storage medium containing instructions that, when executed, cause a computer to:

receive a source image captured by a device and reference data for the source image via a network connection, the reference data including a horizontal position of the device, a vertical position of the device, and a magnetic direction of the device;

generate and transmit to a network database a query requesting a target image matching the reference data;

receive the target image matching the reference data and blend the target image with the source image to generate a blended image; and send the blended image to the device via the network connection.

9. The non-transitory computer-readable storage medium of claim 8, wherein the reference data further includes at least one of a focus position of the device and a geographic location of the device associated with capturing the source image.

10. The non-transitory computer-readable storage medium of claim 8, wherein the instructions to blend the target image with the source image comprise further instructions that cause the computer to:

alter at least one element in the target image to align with a common element in the source image; and blend elements of the altered target image with elements of the source image to generate the blended image.

11. The non-transitory computer-readable storage medium of claim 8, comprising further instructions that cause the computer to:

determine a subject contained in a portion of the source image that is not contained in a portion of the target image common to the portion of the source image;

preclude elements of the subject from being blended with the target image; and include the subject in the blended image.

12. The non-transitory computer-readable storage medium of claim 8, comprising further instructions that cause the computer to:

determine a subject contained in the target image that is not contained in the source image; and delete elements of the subject from the blended image.

13. The method of claim 1, further comprising:

receiving the source image from the image capture device over a communication network; and transmitting the blended image to the image capture device over the communication network.

14. The method of claim 1, wherein blending the target image with the source image comprises generating the blended image having improved image quality characteristics than a quality of the source image.

* * * * *

UNITED STATES PATENT AND TRADEMARK OFFICE
CERTIFICATE OF CORRECTION

PATENT NO. : 9,479,712 B2
APPLICATION NO. : 12/892107
DATED : October 25, 2016
INVENTOR(S) : Shane D. Voss et al.

Page 1 of 1

It is certified that error appears in the above-identified patent and that said Letters Patent is hereby corrected as shown below:

In the Claims

In Column 6, Line 43, in Claim 1, delete "interface" and insert -- interface; --, therefor.

Signed and Sealed this
Seventeenth Day of January, 2017

Michelle K. Lee
*Director of the United States Patent and Trademark Office*